(12) United States Patent
van Os

(10) Patent No.: US 7,715,061 B2
(45) Date of Patent: May 11, 2010

(54) DOCUMENT ROUTING METHOD FOR UTILIZING PAPER MEDIUM TO DIRECT OUTCOME OF SCANNED DOCUMENTS AND SOFTWARE THEREFOR

(75) Inventor: Ron van Os, Morrison, CO (US)

(73) Assignee: Visioneer, Inc., Pleasanton, CA (US)

( * ) Notice: Subject to any disclaimer, the term of this patent is extended or adjusted under 35 U.S.C. 154(b) by 1312 days.

(21) Appl. No.: 10/792,636

(22) Filed: Mar. 4, 2004

(65) Prior Publication Data

US 2005/0195447 A1 Sep. 8, 2005

(51) Int. Cl.
H04N 1/04 (2006.01)
(52) U.S. Cl. .............. 358/474; 358/1.15; 358/448; 358/407; 235/385; 705/26
(58) Field of Classification Search ............. 358/474, 358/486, 1.15, 442, 402, 448, 407, 1.14; 382/274, 166; 235/385, 454; 705/26
See application file for complete search history.

(56) References Cited

U.S. PATENT DOCUMENTS

| | | | | |
|---|---|---|---|---|
| 5,272,322 | A * | 12/1993 | Nishida et al. | 235/462.31 |
| 5,513,126 | A * | 4/1996 | Harkins et al. | 709/228 |
| 5,694,617 | A * | 12/1997 | Webb et al. | 710/40 |
| 5,838,814 | A * | 11/1998 | Moore | 382/115 |
| 5,974,202 | A * | 10/1999 | Wang et al. | 382/306 |
| 5,982,502 | A * | 11/1999 | Jinnai | 358/296 |
| 6,222,644 | B1 * | 4/2001 | Chen et al. | 358/403 |
| 6,327,047 | B1 * | 12/2001 | Motamed | 358/1.15 |
| 6,798,545 | B1 * | 9/2004 | Shih | 358/474 |
| 6,975,434 | B1 * | 12/2005 | Pilu et al. | 358/474 |
| 7,474,428 | B2 * | 1/2009 | Morris-Jones et al. | 358/1.15 |
| 7,548,350 | B2 * | 6/2009 | Doyle | 358/474 |
| 2003/0110443 | A1 * | 6/2003 | Yankovich et al. | 715/501.1 |
| 2003/0117670 | A1 * | 6/2003 | Brugger et al. | 358/474 |
| 2003/0144923 | A1 * | 7/2003 | Capozzi et al. | 705/26 |
| 2003/0233274 | A1 * | 12/2003 | Urken et al. | 705/12 |
| 2004/0215544 | A1 * | 10/2004 | Formale et al. | 705/36 |
| 2004/0252349 | A1 * | 12/2004 | Green et al. | 358/440 |

(Continued)

Primary Examiner—Negussie Worku
(74) Attorney, Agent, or Firm—Diane Van Os

(57) ABSTRACT

The invention claimed is a method for creating and utilizing a paper intermediary, ideally termed a document routing form, to serve as a lead sheet to a set of documents to be scanned on a scanner connected to a computer, or a computer connected to a workgroup. Computer readable data, such as bar code, printed on the routing form serve as data instructions to the inventive software to process a set of scanned documents in a variety of end outcome options. The document routing forms may be printed on an 8.5 by 11 inch sheet of paper, or on an adhesive type label, and contain selection options that determine an outcome to documents scanned.

Options for end outcomes may include processing the scan as an email, a fax, or being sent to a User's electronic archive. The inventive software facilitates data retrieval from a secondary source such as a User's electronic archive to be utilized in the outcome process. The inventive method also allows for a combination of encoded data and hand written data to be read from a document routing form, and processed by a secondary program such as an email or fax program.

10 Claims, 4 Drawing Sheets

U.S. PATENT DOCUMENTS

| | | | |
|---|---|---|---|
| 2005/0004885 A1* | 1/2005 | Pandian et al. | 707/1 |
| 2005/0146743 A1* | 7/2005 | Firooz | 358/1.15 |
| 2005/0146754 A1* | 7/2005 | Firooz | 358/440 |
| 2005/0213162 A1* | 9/2005 | Ahne et al. | 358/400 |
| 2006/0039038 A1* | 2/2006 | Wang et al. | 358/451 |
| 2008/0112564 A1* | 5/2008 | Vanderstraeten | 380/243 |
| 2009/0027710 A1* | 1/2009 | Nakajima | 358/1.13 |
| 2010/0027048 A1* | 2/2010 | Aritomi et al. | 358/1.14 |

* cited by examiner

Scan as fax with handwritten data

Scan as email requiring secondary source

DOCUMENT ROUTING METHOD FOR UTILIZING PAPER MEDIUM TO DIRECT OUTCOME OF SCANNED DOCUMENTS AND SOFTWARE THEREFOR

FIELD

The invention relates to a method for creating and utilizing a paper intermediary, an example being a document routing form, to provide directions via a software system to a stand alone scanner facilitating an end outcome to documents scanned, or a "scan job". The routing form is created by a User via the inventive software as installed on a User's computer, and printed to result in the document routing form. The document routing form may be produced in formats containing all required data or formats whereby a User may enter additional data relating to the desired scan outcome. Various outcomes may include the scan job resulting in an automatically transmitted fax, an electronic mail format, or routing of said scan job to a user's electronic archive. The paper intermediary may be represented by a document routing form, adhesive label or other physical paper medium.

BACKGROUND OF THE INVENTION

The invention most closely corresponds with USPTO Class 399, wherein the invention provides for machine control and document handling via electrophotography and software for control thereof.

In its simplest form, the invention comprises a paper medium upon which a User may place instructions relating to a set of scanned items, or "scan job". An example may be a User simply hand writing "fax to Bob" on the paper medium and placing it as the lead page to the items to be scanned. The inventive method, having the capability to recognize the characters "fax to Bob", then processes the scan as per the instructions on the document routing form. A second example is a document routing form on which is encoded complete data instructions wherein a User does not have to intervene. Another example may be comprised of a routing form with coded data that includes direction to the inventive software to obtain information from a secondary source, such as a User's electronic archive, in order to process the scan job. Currently, there exists no identifiable process for utilizing a paper intermediary which essentially "instructs" a scanner and its appropriate software on what actions to take in regard to a scan job. The invention relates primarily to an environment or configuration comprising a user's computer with a scanner attached thereto.

The scanning process as it exists prior to the invention requires a user to place items to be scanned in or upon a scanner, make some choice as to the character of the scan, i.e. press a button on the physical scanner or give commands in a software program which was previously installed on a user's computer. Typically such software was bundled with the scanner when purchased. The scan job is then processed optically and results in either a printed or electronic form, such as a simple copy of the document scanned. The invention herein provides for a paper medium which will instruct the scanner how to process the scan job, and offers routing form options which range from requiring no User intervention (a novice computer user) to enabling a more advanced User to insert additional instruction data. The printed paper medium contains coded data instructions specifying the nature and outcome of the scan job to the scanner. The best example being termed a "document routing form".

The document routing form allows a user to quickly and efficiently perform a scan job without having to configure the scanner either manually or via software. The document routing form may contain all required data to instruct the scanner as to how to process the scan job without other computative intervention, or the form may contain data instructions to cause the inventive software to seek data from a secondary location to complete the scan job. An example of a secondary program being a User's electronic archive containing data such as an email address, or fax number. Accordingly, the invention provides a significant benefit to the market in terms of providing an efficient, user friendly method to route scanned documents to an ultimate source. A further benefit of the invention results in the option of use of a single scanner by multiple Users thereby obtaining the maximum benefit from a single scanner purchase. The inventive software allows a User to create and a print a document routing form. Once printed, the User takes the form and processes his scan job utilizing a scanner connected to a computer at a location other than his workstation or office. The inventive software provides for program code which then electronically returns the scanned documents as a file to the User's computer. Once the User returns to his desk, the scanned documents are existent on his computer in electronic format.

THE INVENTION

Summary, Objects And Advantages

The invention comprises in its broadest aspects, a new and unique method of utilizing a paper intermediary to provide a set of instructions, designed to dictate a variety of scan job outcomes as generated by software, to a scanning device. More particularly, the invention comprises a paper medium, an example being termed a document routing form, with data instructions imbedded thereon containing coded directions that will be identified by the inventive software, and result in a user selected outcome for a scan job.

The inventive software allows a User to create a document routing form based upon various options available such as email, fax, or deposit of the scanned items into an electronic archive. Once created and printed, the document routing form contains encoded data instructions which will be recognized by the software when scanned. The form is used as a lead sheet to items to be scanned, i.e. it must be the first page to be scanned.

There are ideally three primary types of document routing forms encompassed by the inventive system. The types to be termed herein as "stand alone" form, a "dependant" form, and the third being a hybrid of the two. The stand alone form contains all encoded instructions to dictate the outcome of a scan job, and no User intervention is required after the form has been printed. The User simply inserts the items to be scanned with the routing form as the lead sheet, and the scan job is completed. The dependent type form may contain coded instructions as in the stand alone form, and may also contain instructions for the inventive software to obtain data from a secondary source, such as a User's electronic database. The form may be further modified as a hybrid of the two form types, wherein the form may contain checkbox, fill-in, or other identifiable selections upon which the User makes a mark or other indicator of selection of a particular option, and may hand enter data to be recognized by the inventive software. The corresponding options are the types of scan outcomes the inventive system provides, such as sending the scan as a fax, email, or to an electronic archive.

An important feature of the inventive software is the ability for a User to hand write information on the routing form, such as a fax number, and to then be able to place the form as the lead sheet to their scan. The handwritten data is recognized or read by a standard optical character recognition process which exists as part of the inventive software. Thus, if a User has hand written data such as a fax number or email address, the inventive software can recognize such data and process the scan accordingly. This OCR process is especially vital to the hybrid type document routing form method.

The dependant routing form may depend upon a secondary source to complete a scan process. Such secondary sources may be a User's electronic archive of data which contains email addresses, fax numbers, or other identifiers that the inventive software requires to facilitate routing of the scan. On the dependent routing form, the encoded data provides a path to the secondary source to obtain the additional information the User has indicated as required to complete the routing process, and the inventive software facilitates the retrieval. This process occurs transparently to the User, who has simply placed the dependent form as the lead sheet to their documents and started the process by pressing the "scan" button on the scanner.

Further, the invention provides for a set of specific outcomes indicated on the document routing form from which a user may select to govern the outcome of a particular scan job.

A first example of an outcome includes selecting an option on the document routing form for the scan job to be characterized as a "fax". The User selects the fax option on the form and places the scan job into the scanner with the form as the lead page, whether embodied by a full page sheet, or a label as affixed to the first page of the scan. In the event of a hybrid form, the user may hand write a fax number on the routing form in a field provided adjacent to the selected fax option, and the OCR function of the software reads the number and processes the scan as a fax. In the event of the dependant form method, the user selects the fax option which will contain encoded data instructing the software of the secondary source to be accessed to obtain the corresponding fax number. In both events, the scan is processed as a fax and sent upon the User initiating the scan.

A second outcome may include sending the scan job as an electronic mail file. Again, the User makes a selection on the document routing form and places the items to be emailed on the scanner. In the event of a hybrid form, the User may hand write an email address in the field provided adjacent to the selected email option. The OCR function of the software reads the email address and processes the scan accordingly. In the event of a dependant form, the encoded data on the form instructs the scanner that this scan is to result in an email, and instructions are communicated via the software to obtain the email address from a secondary source. Transparent to the User, the retrieval of information from the secondary source occurs, and the scan is sent as an email.

A third outcome may include the option of sending a scan job to an electronic archive which already exists on a User's system. The User selects the archive option on the document routing form, which in turn instructs the scanner to scan and send a copy of items scanned to the User's presently configured electronic archiving system.

In all the outcome options detailed above, the routing method occurs as a result of computer readable data encoded on the document routing form, which is printed after creation by a User utilizing the software provided with the routing form method. Such encoded data is comprised of, as an exemplary embodiment, a set of computer readable data elements which depict the nature of the desired result of a scan job, and may include a variety of computer readable code. The routing form may present several options for the outcome of the scan job wherein each option has its own set of code. The user simply makes a mark in a "check box" or similar selection criteria on the form. The routing form then serves as a lead page to a scan job whereby the user simply places the form as page one of his scan job, and the software system recognizes the coded instructions and executes that specific scan job, e.g. determine if it is a fax and perform the steps of transmitting. The code on the routing form is "read" by the software system, and translated into steps of function as dictated by the selection the user has made on his form.

The document routing form itself may be represented by a number of paper media. The routing form may be a full page document, i.e. 8.5×11 inches, or the form may also be depicted on an adhesive type label that a User may place on the first page of their scan job. The label contains encoded data for routing as indicated in the options above, as originally created by the inventive software, and printed by the User.

The document routing system is ideal for function in a stand alone, or single computer environment, as well as a workgroup, or multiple computer environment. In the latter example, the inventive software will recognize each associated user's routing form as created on their individual computer, and may insert encoded identifiers on the routing form itself. Such recognition, or signature, of each User is embodied on the document routing form upon creation on the User's computer as specific code signatures unique to that computer. Recognition signatures may include a computer name, date and time of activity, or other identifiers as desired by a User for traceability of a particular activity.

BRIEF DESCRIPTION OF THE DRAWINGS

The invention is described in further detail by reference to the drawings in which:

FIG. 1 is a sample document routing form utilizing bar code type readable data, and including selection boxes for scan options;

FIG. 2 is a sample adhesive label form document routing format;

DETAILED DESCRIPTION, INCLUDING BEST MODES OF CARRYING OUT THE INVENTION

Figure 3:
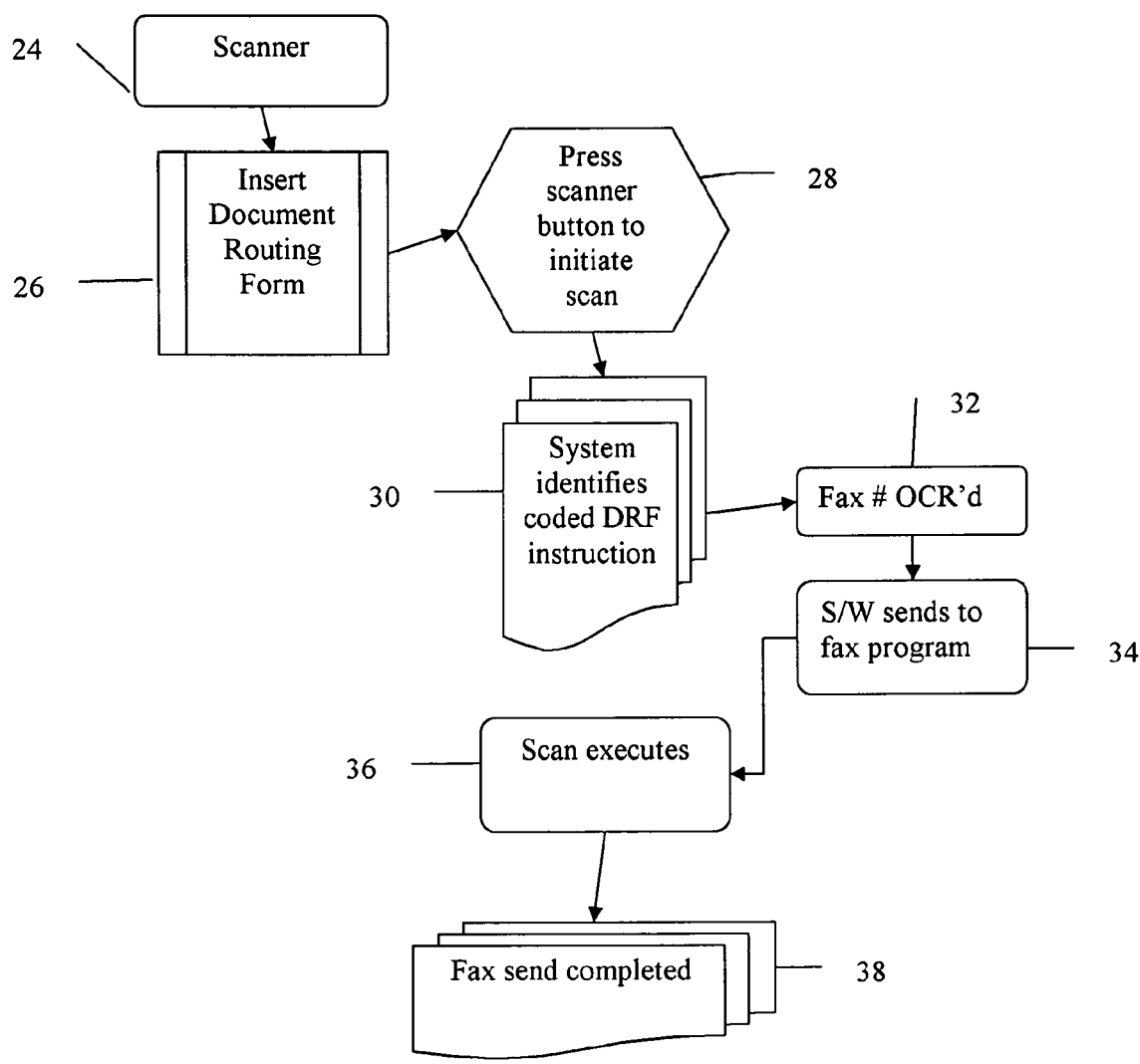
FIG. 3 is a flow chart indicating the process of a scan being executed by the inventive method as a facsimile.

The following detailed description illustrates the invention by way of example, not by way of limitation of the principles of the invention. This description will clearly enable one skilled in the art to make and use the invention, and describes various embodiments, adaptations, variations, alternatives, and uses of the invention. The description includes what are presently believed to be the best modes of carrying out the invention.

In this regard, the invention is illustrated in five relatively simple figures; although sufficiently complex as to illuminate to one skilled in the art of such software architecture, programming, and computer operations a viable method for making or using said invention.

FIG. 1 illustrates an example of a stand alone document routing form as may exist offering the check box selection method. A bar code, or any computer readable data 10 may be applied at the top of the form and would contain elements identifying the document as a document routing form. Corresponding numerals and/or alpha characters 12 may be placed under the bar code and contain corresponding data identifiers which similarly identify the form.

FIG. 1 also provides an example of various checkbox option selections, with 14 showing a checked option box. The checked box contains a bar code to the left of the option which contains data instructions specific to the checked item, i.e. instructions that the inventive software will recognize and process according to the selection type. FIG. 1 further shows an example of an option 16 of a hybrid type form whereby a User may select a check box that may contain either a handwritten email address, or as described herein above, an instruction set that the inventive software recognizes as requiring data from a secondary source. For clarification, the inventive software seeks out the secondary source, retrieves the data, such as here an email address, and executes the selected scan as an email. The latter is accomplished via the User's current email program.

FIG. 2 demonstrates an example of a document routing form in the embodiment of an adhesive type label which may be affixed to the first page of a User's scan job. Any computer readable code 20 functions in much the same manner as in FIG. 1, whereby the elements of the code contain data identifying the document as a document routing form. Handwritten data 22 may be entered in and read in similar fashion to FIG. 1. For clarification, this adhesive type label contains instructions sufficiently complete to allow the inventive software to recognize that the scan job is intended, as an example, to be sent to a User's electronic archive or computer archive. As described in the invention summary, the inventive software transmits the scan once completed, to an already established electronic archive location as specified by the User upon installation and set up of the inventive software.

FIG. 3 is a flow chart exemplifying the steps in the process of the inventive system processing a scan job as a fax transmission. The User's scanner 24 receives a document routing form 26, whether an 8.5×11 paper form, or an adhesive label affixed to a lead page as in FIG. 2. The User presses the scanner button 28 to initiate the scan. The inventive system identifies coded data from the routing form 30 by recognizing the bar code data or a combination of bar code data and handwritten data. In the case of handwritten data 32, the inventive software runs an OCR type process and reads the fax number as provided by the User. The inventive software then transmits the scan job as a fax 34.

Further to FIG. 3, once the inventive software has sent the recognized fax number to the User's existing fax program, that program will acknowledge the scan as a fax 36 and transmit said fax, as is typical to the functionality of the User's fax program 38.

Figure 4:
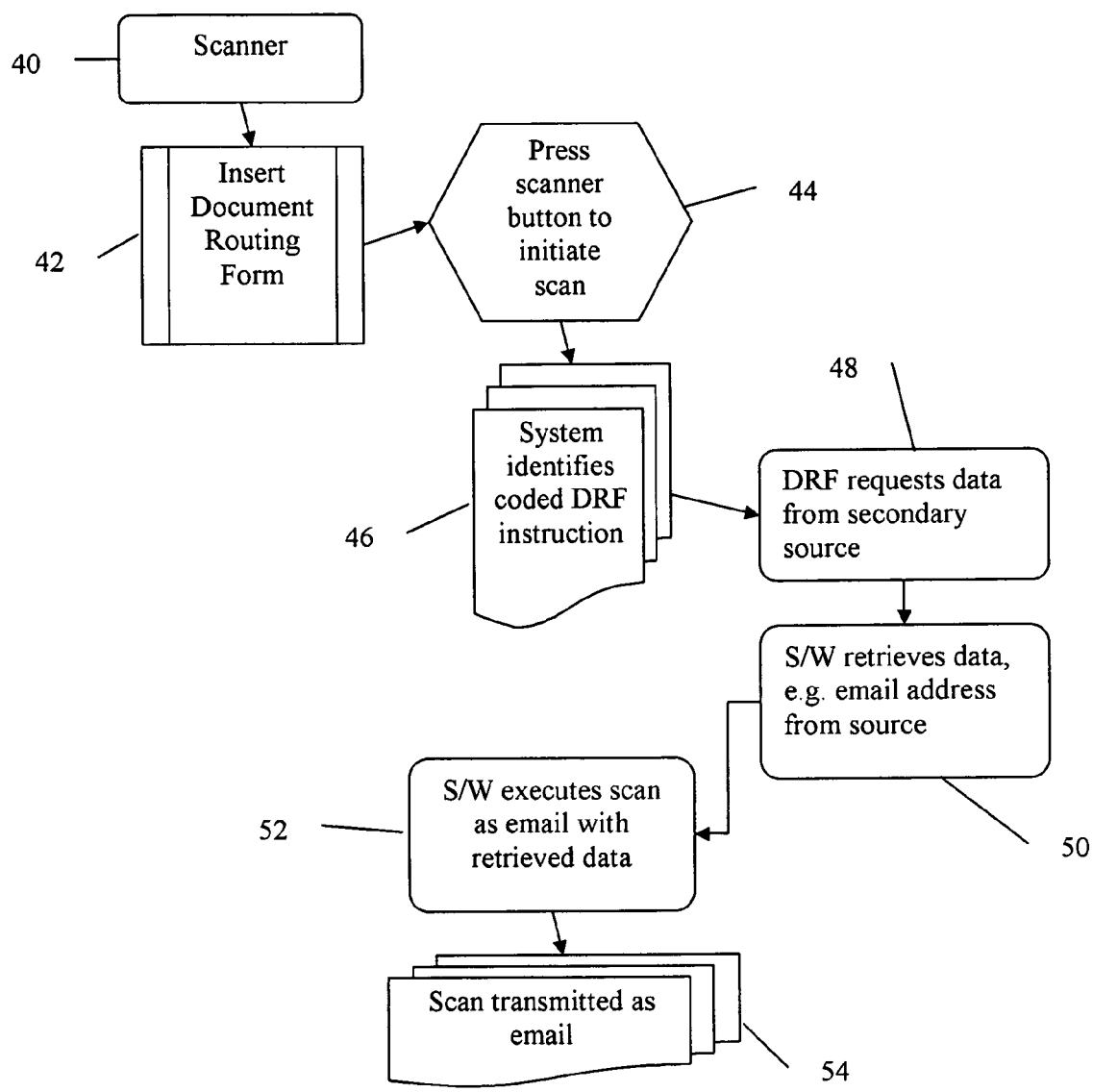
FIG. 4 which is a flowchart indicating the process of a scan being executed as an email by the inventive method.

FIG. 4 is a flowchart exemplifying a scan job being processed and transmitted as an email, in which data is required from a secondary source. Again, the user inserts documents into a scanner 40, with the document routing form as the lead page 42. The User presses a scanner button to initiate the scan 44. The inventive system then identifies the coded instruction on the routing form as presented in the form of bar code data 46. For clarification, such bar code data may contain elements which designate a secondary source, i.e. a User's database, from which the inventive software is to retrieve an actual email address.

Further to FIG. 4, the routing form instructs the inventive software to retrieve data from a secondary source 48, and the retrieval is facilitated by the software 50, e.g. an email address as exists on a User's electronic database. The inventive software then adds the retrieved email address to the other instructions on the form, and sends the scan to a User's email existing client 52. Finally, the scan job is transmitted as an email 54 by a User's existing email program.

Figure 5:
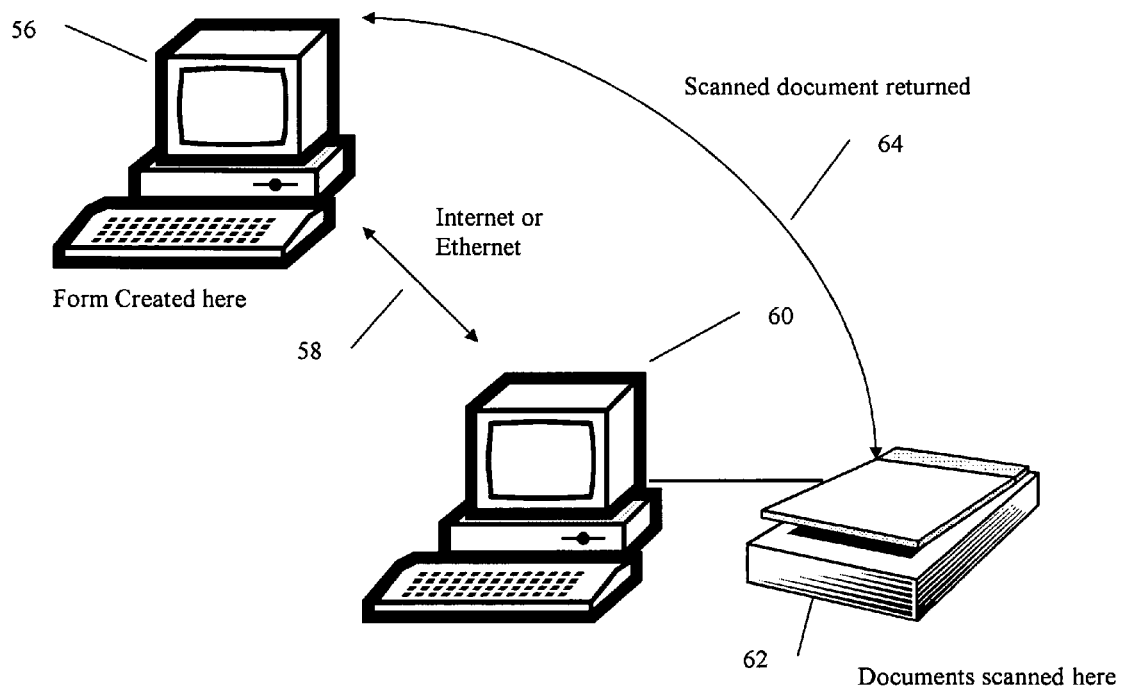
FIG. 5 depicts a shared resource environment.

FIG. 5 is a simple diagrammatic representation of an environment whereby more than one computer is able to utilize a single scanner. A User's computer 56 may be the source for the document routing form. The User then takes a printed form to another workstation which is connected via some means; here an example is Ethernet or Internet 58. The connected workstation or computer 60 is itself linked to a stand alone scanner 62. The User simply scans his documents 62 using the document routing form as the lead page, and returns to his own computer 64 wherein the inventive software has effected the deposit of the documents scanned as an electronic file.

The invention claimed is:

1. Apparatus for creating and utilizing a paper intermediary to provide directions to a stand alone scanner facilitating an end outcome to documents scanned, comprising:
    a) means for creating and utilizing a paper based intermediary to direct outcomes of documents inserted into a scanning device;
    b) means for communication between scanning device and software system to facilitate scanning outcomes;
    c) means for providing a variety of scanning outcomes based upon type of paper intermediary used;
    d) means for communicating with a secondary source to facilitate scanning outcomes wherein the apparatus creates a paper intermediary comprising: a plurality of selection boxes for selecting a scan option; a plurality of computer readable bar codes containing data instructions specific to one of the selection boxes characterized in that the computer readable codes and selection boxes form a plurality of routing options for the outcome of the scan wherein each option has its own computer readable code.

2. A paper intermediary printable by a user and insertable into a scanner as a lead page of documents to be scanned, comprising a plurality of selection boxes for selecting a scan option; a plurality of computer readable bar codes containing data instructions specific to one of the selection boxes; characterized in that the computer readable codes and selection boxes form a plurality of routing options for the outcome of the scan wherein each option has its own computer readable code.

3. A paper intermediary, as in claim 2 whereby a User may select via software the size or type of the paper medium and print as a form from a standard printer, comprising:
    a) computer readable data wherein the elements of the computer readable data contain instruction sets directed to a particular outcome of a set of scanned documents;
    b) computer readable data combined with handwritten data as set forth in User selectable format related to the computer readable data;
    c) computer readable data wherein elements of the computer readable provide instruction sets for the software to retrieve data from a secondary source;
    d) any computer readable code which may be printed onto a paper media.

4. A paper intermediary as in claim 3 wherein User selectable options relating to specific selections is embedded thereupon, comprising:
    a) coded data characterizing an option to scan and send as a fax;
    b) coded data characterizing an option to scan and send as an email;

c) coded data characterizing an option to scan and send to an electronic archive.

5. A method for creating and utilizing a paper intermediary to provide directions to a stand alone scanner facilitating an end outcome to documents scanned, comprising:
  a) creating and utilizing a paper based intermediary to direct outcomes of documents inserted into a scanning device;
  b) communicating between a scanning device and software system to facilitate scanning outcomes;
  c) providing a variety of scanning outcomes based upon type of paper intermediary used;
  d) communicating with a secondary source to facilitate scanning outcomes wherein the method creates a paper intermediary comprising a plurality of selection boxes for selecting a scan option; a plurality of computer readable bar codes containing data instructions specific to one of the selection boxes characterized in that the computer readable codes and selection boxes form a plurality of routing options for the outcome of the scan wherein each option has its own computer readable code.

6. A computer-readable medium encoded with computer executable program or instructions comprising program code enabling design and printing of a paper document routing form with computer readable code thereon according to the method of claim 5.

7. A computer-readable medium as in claim 6 wherein means for communicating to a secondary electronic source are accomplished by program code causing a retrieval of data from said source.

8. A computer-readable medium as in claim 7 wherein program code causes retrieved data to be processed with a separate fax or email client.

9. A computer-readable medium as in claim 8 wherein program code allows for the deposit of scanned data into a separate electronic archive.

10. A computer-readable medium as in claim 9 wherein program code allows for the creation of a document routing form on one computer, and allowing documents scanned on a scanner connected to a different workgroup computer to be deposited back to the original computer that created the form.

* * * * *